United States Patent
Zhang et al.

(10) Patent No.: US 11,449,567 B2
(45) Date of Patent: Sep. 20, 2022

(54) METHOD AND APPARATUS FOR DETECTING REGIONAL EVENT BASED ON SEARCH ENGINE, AND STORAGE MEDIUM

(71) Applicant: BAIDU ONLINE NETWORK TECHNOLOGY (BEIJING) CO., LTD., Beijing (CN)

(72) Inventors: Qi Zhang, Beijing (CN); Hengshu Zhu, Beijing (CN); Hui Xiong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 183 days.

(21) Appl. No.: 16/939,980

(22) Filed: Jul. 27, 2020

(65) Prior Publication Data
US 2021/0034689 A1 Feb. 4, 2021

(30) Foreign Application Priority Data

Jul. 30, 2019 (CN) .......................... 201910696186.1

(51) Int. Cl.
*G06F 16/9537* (2019.01)
*G06F 16/906* (2019.01)
*G06F 16/9538* (2019.01)
*G06F 16/9035* (2019.01)

(52) U.S. Cl.
CPC ........ *G06F 16/9537* (2019.01); *G06F 16/906* (2019.01); *G06F 16/9035* (2019.01); *G06F 16/9538* (2019.01)

(58) Field of Classification Search
CPC ............. G06F 16/9537; G06F 16/9035; G06F 16/906; G06F 16/9538
USPC .......................................................... 707/706
See application file for complete search history.

(56) References Cited

U.S. PATENT DOCUMENTS

| | | | | |
|---|---|---|---|---|
| 7,428,522 B1 * | 9/2008 | Raghunathan | ...... | G06F 16/9537 |
| 7,937,403 B2 * | 5/2011 | Kehl | .................. | G06F 16/9535 |
| | | | | 707/750 |
| 8,032,302 B1 * | 10/2011 | Agronow | ................ | G01W 1/02 |
| | | | | 702/3 |
| 8,554,873 B1 * | 10/2013 | Ganesh | ............. | G06F 16/24578 |
| | | | | 709/217 |
| 9,152,667 B1 * | 10/2015 | Wu | ...................... | G06F 16/3331 |

(Continued)

FOREIGN PATENT DOCUMENTS

| | | | | | |
|---|---|---|---|---|---|
| CN | 101641674 A | * | 2/2010 | ......... | G06F 16/2228 |
| CN | 107908616 A | * | 4/2018 | ........ | G06F 16/9535 |

OTHER PUBLICATIONS

Lee et al., "Discovery of unusual regional social activities using geo-tagged microblogs", World Wide Web (2011) 14: pp. 321-349. (Year: 2011).*

*Primary Examiner* — Phuong Thao Cao
(74) *Attorney, Agent, or Firm* — Fay Sharpe LLP

(57) ABSTRACT

The present disclosure provides a method, and an apparatus for detecting a regional event based on a search engine, a search engine, a computer device, and a storage medium. The method includes: obtaining key search data related to the regional event based on search data of the search engine; performing regional event detection based on the key search data related to the regional event; and when the regional event is detected, estimating a location of the detected regional event based on geographical distribution of the key search data related to the regional event.

11 Claims, 6 Drawing Sheets

(56) References Cited

U.S. PATENT DOCUMENTS

| | | | |
|---|---|---|---|
| 9,648,075 B1* | 5/2017 | Kalinke | G06F 3/04842 |
| 9,761,140 B2* | 9/2017 | Rosas-Maxemin | G08G 1/144 |
| 9,953,083 B2* | 4/2018 | Singh | G06F 16/9535 |
| 10,671,651 B1* | 6/2020 | Gratton | G06F 16/29 |
| 10,791,073 B2* | 9/2020 | Schneeman | H04L 67/18 |
| 2008/0133503 A1* | 6/2008 | Popescul | G06Q 30/0275 |
| | | | 707/999.005 |
| 2008/0301117 A1* | 12/2008 | Zeng | G06F 16/951 |
| | | | 707/999.005 |
| 2011/0040733 A1* | 2/2011 | Sercinoglu | G06F 16/951 |
| | | | 707/E17.014 |
| 2011/0202513 A1* | 8/2011 | Singh | G06F 16/951 |
| | | | 707/706 |
| 2013/0036107 A1* | 2/2013 | Benyamin | G06F 16/31 |
| | | | 707/709 |
| 2014/0040282 A1* | 2/2014 | Mann | B64G 1/1021 |
| | | | 707/736 |
| 2014/0081973 A1* | 3/2014 | Jha | G06F 16/95 |
| | | | 707/E17.089 |
| 2014/0101123 A1* | 4/2014 | Ganesh | G06Q 30/0261 |
| | | | 707/723 |
| 2015/0058743 A1* | 2/2015 | Wall | G06F 16/951 |
| | | | 715/744 |
| 2015/0169628 A1* | 6/2015 | Maennel | H04W 64/00 |
| | | | 707/775 |
| 2015/0187203 A1* | 7/2015 | Mohler | G08B 27/005 |
| | | | 340/539.13 |
| 2015/0227517 A1* | 8/2015 | Lymberopoulos | |
| | | | G06F 16/9574 |
| | | | 707/706 |
| 2015/0371006 A1* | 12/2015 | McMillan | G06Q 10/04 |
| | | | 705/2 |
| 2016/0092918 A1* | 3/2016 | Cha | G06Q 30/0259 |
| | | | 705/14.55 |
| 2016/0147826 A1* | 5/2016 | Mishra | G06Q 10/063112 |
| | | | 707/736 |
| 2016/0239737 A1* | 8/2016 | Jiang | H04L 67/18 |
| 2017/0132540 A1* | 5/2017 | Haparnas | G06Q 10/1093 |
| 2017/0180280 A1* | 6/2017 | Schneeman | H04L 67/18 |
| 2017/0339006 A1* | 11/2017 | Austin | H04L 67/02 |
| 2018/0246967 A1* | 8/2018 | Hill | G06F 16/951 |
| 2018/0349489 A1* | 12/2018 | Toudji | G06F 40/174 |
| 2019/0068671 A1* | 2/2019 | Mehta | H04L 65/601 |
| 2019/0324981 A1* | 10/2019 | Counts | G06F 16/335 |

* cited by examiner

METHOD AND APPARATUS FOR DETECTING REGIONAL EVENT BASED ON SEARCH ENGINE, AND STORAGE MEDIUM

CROSS-REFERENCE TO RELATED APPLICATION

This application claims a priority to and benefits of Chinese Patent Application No. 201910696186.1, filed Jul. 30, 2019, the entire content of which is incorporated herein by reference.

TECHNICAL FIELD

The present disclosure relates to a field of search engine technologies, and more particularly, to a method for detecting a regional event based on a search engine, an apparatus for detecting a regional event based on a search engine, and a computer-readable storage medium.

BACKGROUND

In the related arts, currently, real-time earthquake detection and earthquake rapid reporting technologies generally adopt the following steps: 1) constructing a large-scale seismic network to monitor seismic signals, which is a first step of general earthquake detection and an infrastructure for seismic monitoring; 2) identifying the signals collected in the first step, detecting the occurrence of earthquake timely, and measuring a series of seismic information such as seismic intensity, this step is usually completed using various time sequence anomaly detection algorithms or template matching algorithms; 3) after the earthquake is detected, releasing the information to the public according to preset standards (such as the earthquake intensity reaches level 3) generally through a dedicated app (application) or various social medias.

However, the above three steps have corresponding deficiencies. For step 1, the construction of the seismic network requires a large amount of funds, and earthquake monitoring cannot be carried out in places without construction conditions or where the network cannot be constructed, thus the monitoring scope is limited. For step 2, earthquake detection using seismic wave signals cannot reflect people's feelings about earthquakes. For step 3, earthquake information cannot be released to the public according to the requirements of the people for the earthquake information, and from the perspective of information releasing channels, traditionally, timely releasing cannot be achieved through medias and APPs (applications), and the above traditional releasing methods are untargeted and not popularized.

SUMMARY

Embodiments of a first aspect of the present disclosure provide a method for detecting a regional event based on a search engine. The method includes: obtaining key search data related to the regional event based on search data of the search engine; performing regional event detection based on the key search data related to the regional event; and when the regional event is detected, estimating a location of the detected regional event based on geographical distribution of the key search data related to the regional event.

Embodiments of a second aspect of the present disclosure provide an apparatus for detecting a regional event based on a search engine. The apparatus includes a processor; and a non-transitory computer-readable storage medium storing a plurality of computer-executable instruction modules that are executed by the processor. The computer-executable instruction modules include: a search data obtaining module, configured to obtain key search data related to the regional event based on search data of the search engine; an event detecting module, configured to perform regional event detection based on the key search data related to the regional event; and a location estimating module, configured to estimate a location of the detected regional event based on geographical distribution of the key search data related to the regional event, when the regional event is detected.

Embodiments of a third aspect of the present disclosure provide a computer-readable storage medium having a computer program stored thereon, in which when the computer program is executed by a processor, the method for detecting a regional event based on the search engine according to embodiments of the first aspect is implemented.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
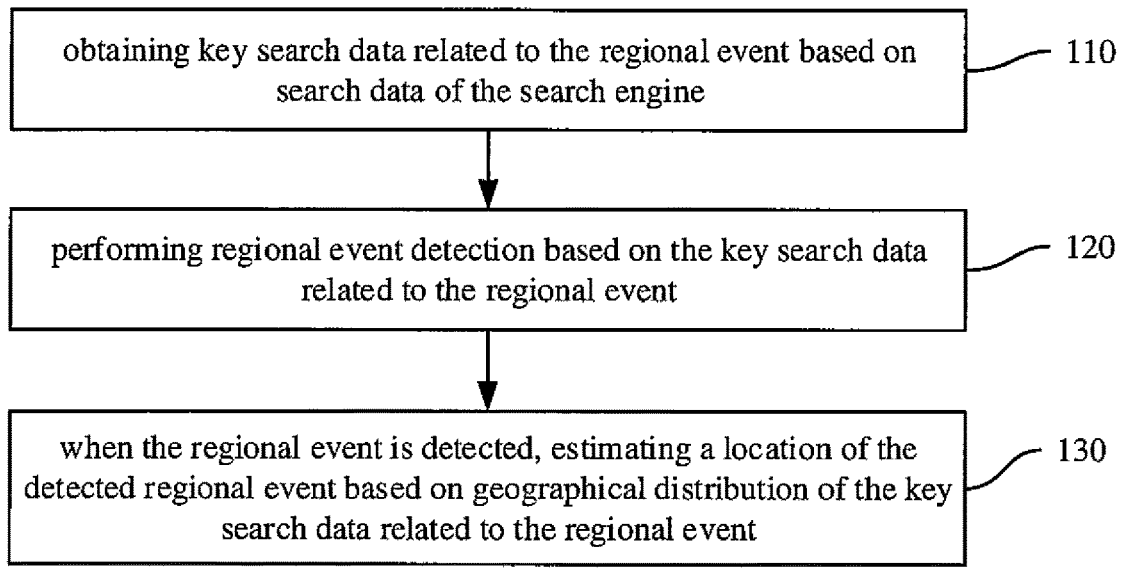
FIG. 1 is a flowchart of a method for detecting a regional event based on a search engine according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

It should be noted that real-time earthquake detection and earthquake rapid reporting technologies refer to real-time identification of various changes caused by earthquakes, so as to timely determine whether an earthquake has occurred and issue early warning messages to the public. Currently, the timely detection and rapid reporting of earthquakes in the earthquake relief work is essential, which enable people to understand the situation of the earthquake in a timely manner and respond to it, and provide relevant information for post-earthquake emergency management of related departments. Even if there is no destructive earthquake, if the people feel ground vibration, they will want to know whether an earthquake has occurred, and timely information release can eliminate panic and rumors. In related arts, the seismic wave signal is physically monitored through the seismic network, and the seismic waveform in the signal is identified and then released to the public according to a predetermined standard (such as an earthquake intensity of level 3). However, the true and accurate earthquake situation can be detected by monitoring seismic waves, but it is difficult to understand the people's feelings about the earthquake, and to timely and accurately release the news to the people who care about the earthquake information. Although the earthquake intensity is less than 3, the public can still detect it. At this time, the earthquake information needs to be released. Sometimes, a vibration not caused by the earthquake can be mistaken as an earthquake, and at this time, safety information should also be released in a timely manner.

In order to solve the above technical problems, the inventors analyzed the search data and found that after a regional event occurs, searches related to keywords such as the regional event quickly erupt in a short period of time. This means that when people feel an abnormality in the environment (such as feeling a tremor), they quickly seek the latest news on whether a regional event has occurred on the Internet. At this time, the general traditional reporting information (such as the traditional official website's reporting information) has not released. This search for information reflects the need of the people to quickly obtain earthquake-related information, and it is also possible to use the search data for regional event detection. For this, this disclosure provides a method for detecting a regional event based on a search engine and a regional event rapid reporting technology, real-time regional event detection can be achieved using the real-time search data of the search engine of the Internet, and event detection result through the search engine can be feedback and released in a timely manner. In detail, a method for detecting a regional event based on a search engine, an apparatus for detecting a regional event based on a search engine, a search engine, a computer device, and a computer-readable storage medium according to embodiments of the present disclosure are described below with reference to the drawings.

FIG. 1 is a flowchart of a method for detecting a regional event based on a search engine according to an embodiment of the present disclosure. It should be noted that the method for detecting the regional event based on the search engine according to the embodiments of the present disclosure can be applied for the apparatus for detecting the regional event based on the search engine according to the embodiments of the present disclosure. The apparatus can be configured on the computer device. For example, the computer device may be the search engine to implement a content search function.

As illustrated in FIG. 1, the method for detecting the regional event based on the search engine may include the following actions.

At block 110, key search data related to the regional event is obtained based on search data of the search engine.

In an embodiment of the present disclosure, the search data may include information such as search content, search time, and search location. In detail, firstly, the search data of the search engine needs to be stored. In this disclosure, clusters can be used for large-scale data management. Before performing event analysis and detection, the data need to be desensitized to remove personal information from the search data for data desensitization, and information such as search content, search time, and search location are retained only.

It is understood that, the stored search data includes a large number of searches that are not related to the regional event, and the searches that are most closely related to the regional event need to be filtered out to obtain the key search data related to the regional event. For example, based on the search content in the search data, target search data containing preset keywords may be selected from the search data of the search engine, and according to search content and search time in the target search data, the number of each search within a first preset time period before and after the regional event occurs is counted to calculate an association degree between each search and a sudden occurrence of the regional event, and according to the association degree between each search and the sudden occurrence of the regional event, the key search data related to the regional event is selected from the target search data.

Alternatively, according to the search content and search time in the target search data, the number of each search within the first preset time period before and after the regional event occurs is counted to obtain an average search frequency of each search before the regional event occurs and an average search frequency of each search after the regional event occurs. According to the average search frequency of each search before the regional event occurs and the average search frequency of each search after the regional event occurs, the association degree between each search and the sudden occurrence of the regional event is calculated, and then the key search data related to the regional event is selected from the target search data according to the association degree between each search and the sudden occurrence of the regional event.

For example, taking the regional event as an earthquake event as example, related searches that include the keyword "earthquake" are selected from historical search data, and then the earthquake catalog during this period is used to count the number of each search within a period of time before and after the earthquake, and the average search frequencies before and after the earthquake for each search can be obtained, i.e., $Freq_{pre}$ and $Freq_{post}$. Based on these two historical statistical frequencies, an indicator that reflect the degree of correlation between the search and the sudden event can be calculated. After the occurrence of the sudden event, the greater the frequency increase, the more relevant searches, and the higher the indicator. The higher the indicator of the search, the more significant the growth of this search after the event, and the more closely it is related to the occurrence of time. This application can use this indicator to select several searches (for example, "earthquake", "earthquake news", "earthquake network", "an earthquake just happened", "today's latest news on earthquake", "CENC (China Earthquake Networks Center)", "China seismic network", and "where did the earthquake just happened") as the search content for monitoring the earthquake. In this way, in the real-time detection, it is only necessary to extract searches of these key content from the real-time search data, irrelevant information can be filtered out and efficiency can be improved.

At block 120, regional event detection is performed based on the key search data related to the regional event.

In this action, based on the key search data related to the regional event, a time sequence anomaly detection algorithm can be used to detect emergencies in the search data. For example, a two-phase anomaly detection algorithm is designed for the search data, the first stage is statistical anomaly detection, and the second stage is machine learning method. The two stages of the method can be freely selected. In order to facilitate the understanding of this disclosure by a person skilled in the art, a method embodiment is given below, in which the anomaly detection part based on statistics can use the multi-interval differential detection designed, and the machine learning part can use a random forest classification algorithm. It should be noted that this example is only to help those skilled in the art to understand this disclosure. It should not be taken as a specific limitation on this disclosure.

Alternatively, the specific implementation process of detecting an emergency event in the key search data through the above-mentioned time sequence anomaly detection algorithm may be as follows. According to the search content and the search time in the key search data, the key search data is converted into a time sequence, in which the time sequence is used to indicate changes of the search frequency of the key search data over time, and the time sequence includes a plurality of time points and a search frequency of key search data corresponding to each time point. It is detected whether the regional event occurs according to the plurality of time points and the search frequency of key search data corresponding to each time point in the time sequence.

For example, through the first stage of the multi-interval differential detection method in the above-mentioned time sequence anomaly detection algorithm, based on the search content and search time in the key search data, the key search data is converted into a time sequence $S^\delta$ whose search frequency varies over time:

$$S^\delta = \{\{t_1, f_1\}, \{t_2, f_2\}, \ldots, \{t_{n_\delta}, f_{n_\delta}\}\},$$

$$t_n = t_0 + n g \delta,$$

t refers to a timestamp; δ refers to an interval between timestamps; f refers to a search frequency of the key search data corresponding to t, that is, $f_n$ is a search frequency of the key search data between $t_{n-1}$ to $t_n$; $t_0$ is an initial time, and n is the number of the timestamps.

Figure 2:
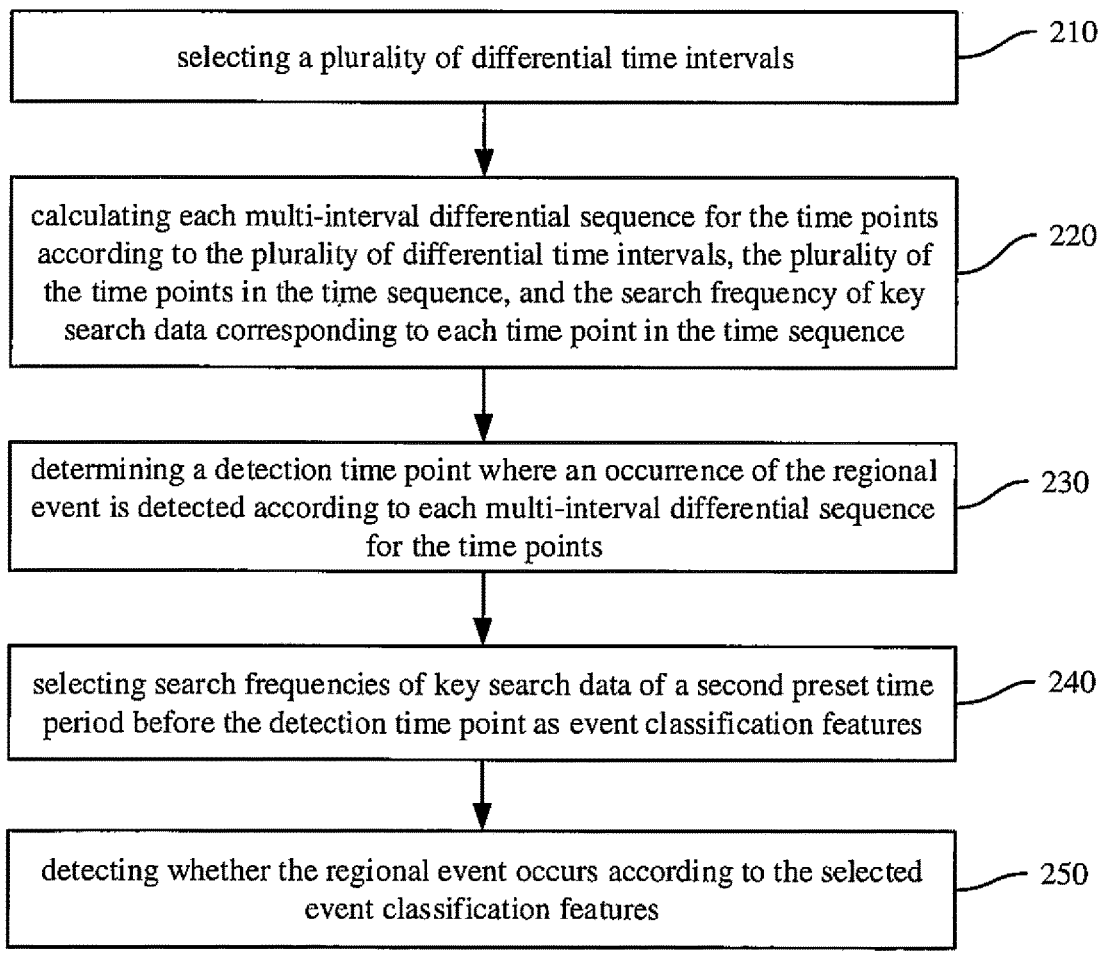
FIG. 2 is a flowchart of a method for detecting a regional event based on a search engine according to an embodiment of the present disclosure.

After obtaining the time sequence corresponding to the key search data, a multi-interval differential sequence can be calculated based on the time sequence, and the time point at which an emergency event occurs is captured based on the multi-interval differential sequence. The captured time points are further classified by the machine learning algorithm to detect whether the regional event occurs. For example, as illustrated in FIG. 2, the specific implementation process of detecting whether the regional event occurs according to the plurality of time points and the search frequency of key search data corresponding to each time point in the time sequence may include the followings.

At block 210, a plurality of differential time intervals are selected.

At block 220, each multi-interval differential sequence for the time points is calculated according to the plurality of differential time intervals, the plurality of the time points in the time sequence, and the search frequency of key search data corresponding to each time point in the time sequence.

Alternatively, after obtaining the time sequence of the key search data, the following formula (1) may be used to calculate the multi-interval differential sequence $D = \{D^{int}\}_{int \in I}$ corresponding to the time sequence according to the plurality of time points in the time sequence and the search frequency of the key search data corresponding to each time point in the time sequence, so that each multi-interval differential sequence for the time points can be obtained.

$$D^{int} = \{d_1^{int}, d_2^{int}, \ldots, d_{n_D}^{int}\}$$

$$int \in I = \{interval_1, interval_2, \ldots, interval_{n_I}\}$$

$$d_i^{int} = f_{i+int} - f_i$$

$$f_{i+int}, f_i \in S^\delta \qquad (1)$$

int refers to the time interval when calculating a differential; D refers to a differential sequence; I refers to a set of intervals in a multi-interval; interval refers to the interval time; $d^{int}$ refers to the differential value of f at the time interval int; and n refers to the number of timestamps.

Figure 3:
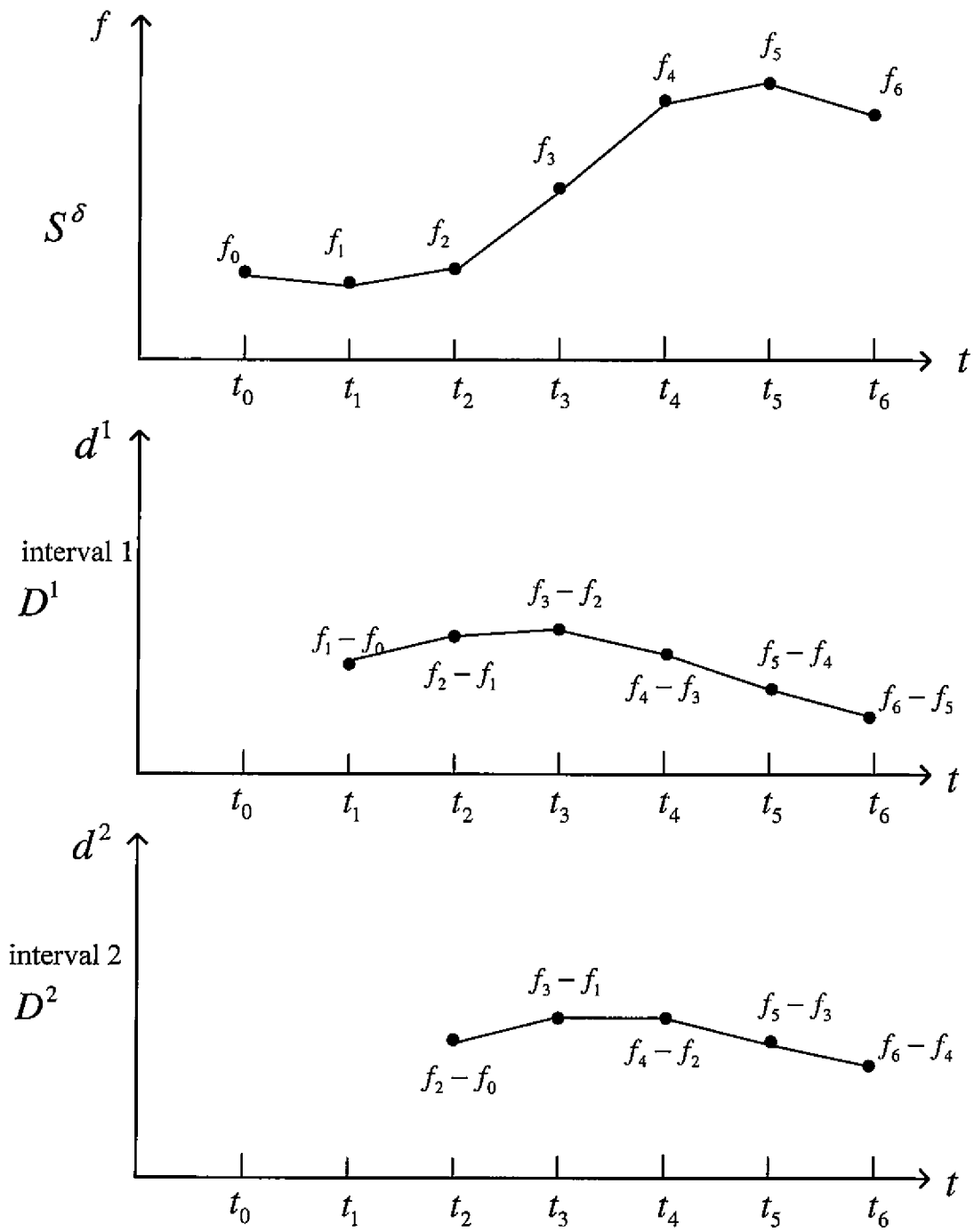
FIG. 3 is a schematic diagram of a time sequence according to an embodiment of the present disclosure.

For example, the obtained time sequence is the time sequence S illustrated in FIG. 3 as an example, where $t_1 = t_0 + 1g\delta$, $t_2 = t_0 + 2g\delta$, $t_3 = t_0 + 3g\delta$, $t_4 = t_0 + 4g\delta$, $t_5 = t_0 + 5g\delta$, $t_6 = t_0 + 6g\delta$, $f_0$ to $f_6$ are the search frequencies of the key search data corresponding to the timestamps from $t_0$ to $t_6$ respectively; suppose two differential time intervals are selected, such as interval 1 and interval 2. For the interval 1, a differential time sequence $D^1$ of the interval 1 is calculated according to the plurality of time points and the search frequency of the key search data at each time point in the time sequence as illustrated in FIG. 3. For the interval 2, according to the plurality of time points and the search frequency of the key search data at each time point in the time sequence illustrated in FIG. 3, a differential time sequence $D^2$ of the interval 2 is calculated. As illustrated in FIG. 3, in this way, one time sequence can be processed into two multi-interval differential time sequences. When calculating each differential value in each multi-interval differential time sequence, calculation can be performed based on the differential time interval, the plurality of time points and the search frequency of the key search data at each time point in the time sequence S. For example, taking the calculation on the differential value $d_1^1$ in the differential time sequence $D^1$ of the interval 1 as an example, the search frequency $f_1$ of the time stamp $t_1$ is subtracted the search frequency $f_0$ of the time stamp $t_0$ in the time sequence S, that is, $d_1^1 = f_1 - f_0$, other differential values can be obtained by analogy. Thus, each multi-interval differential sequence for the time points can be obtained.

At block 230, a detection time point where an occurrence of the regional event is detected, is determined according to each multi-interval differential sequence for the time points.

In this action, the short-term average value/long-term average value (STA/LTA) method with different thresholds can be applied for each interval differential sequence. When detection is performed at one time point, all sequences trigger the thresholds, such that the emergencies can be captured, and this method has the characteristics of fast, accurate, and low false alarm rate. For example, for each time point, a short-term average value and a long-term average value of each interval may be calculated according to each multi-interval differential sequence for the time points, and according to the short-term average value and the long-term average value of each interval, the ratio of the short-term average value to the long-term average value of each interval can be calculated, and when it is determined that the ratio of each interval is greater than a preset threshold value of each interval in a maximum differential time interval before a time point, it is detected that the regional event occurs, and the one time point is determined as the detection time point where the occurrence of the regional event is detected, and the time point obtained by subtracting the maximum differential time interval from the one time point is the event occurrence time detected.

That is, each multi-interval differential time sequence has a threshold value, which can be set in advance. This threshold value can be used to determine whether the ratio of the short-term average value to the long-term average value exceeds this value. If the ratios at all the time intervals exceed the threshold values, an emergency is considered to have occurred. The short-term average value is the average value of the differential value in a short time (for example, 2 minutes), and the long-term average value is the average value of the differential value in a long time relative to the short-term average value. For example, taking the example illustrated in FIG. 3 as an example, both of the interval differential time sequences can be set in advance with corresponding thresholds, and based on each differential value in each interval differential time sequence, the ratio of the short-term average value to the long-term average value under the interval can be calculated, to determine whether the ratio of the short-term average value to the long-term average value at each interval exceeds the threshold value corresponding to the interval. If there is a time point, when the ratios of the short-term average value to the long-term average value at all intervals exceed the thresholds corresponding to the intervals, the occurrence of the regional event is captured, and the time point to which these two intervals belong is used as the detection time point at which the event occurrence is detected.

For example, suppose a plurality of differential time intervals $\{1, 2, \ldots, m\}$ (which can be understood as the timer intervals are 1 minute, 2 minutes, . . . , m minutes, or 0.5 minutes, 1 minute, . . . , m*0.5 minutes) are selected, then at the time $t_n$ of detection, the short-term average value/long-term average value (STA/LTA) method is applied for each interval differential sequence to obtain the corresponding ratio sequence of short term and long term: $r_{t_n}^m, \ldots, r_{t_n-m+2}^2, r_{t_n-m+1}^1$, where, $r_{t_n}^m$ represents the value $r^m$ at time $t_n$ (that is, the ratio of short term and long term of differential sequence at the interval m), $r_{t_n-m+2}^2$ represents the value $r^2$ at time $t_n-m+2$ (that is, the ratio of short term and long term of differential sequence at the interval 2), and $r_{t_n-m+1}^1$ represents the value $r^1$ at time $t_n-m+1$ (that is, the ratio of short term and long term of differential sequence at the interval 1); if each value in the ratio sequence of short term and long term is greater than a corresponding preset threshold, an occurrence of the event is detected, where $t_n$ is the detection time point at which the event is detected, and $t_n-m$ is the event occurrence time detected.

At block 240, search frequencies of key search data of a second preset time period before the detection time point are selected as event classification features.

It should be noted that the search frequency in this action can be counted by the search content, which contain richer information. That is, the search frequencies of various key search content for a period of time before the detection time point may be selected and used as the event classification features.

At block 250, it is detected whether the regional event occurs according to the selected event classification features.

For example, machine learning can be used for classification. For example, the selected event classification features may be input into a pre-trained classifier for prediction, so as to detect whether an event corresponding to the event classification features is the regional event, thereby determining whether the regional event occurs.

Therefore, through the above blocks 210 to 250, it is possible to detect whether the regional event occurs based on the characteristics of the changes of the search frequency of the key search data over time.

At block 130, when the regional event is detected, a location of the detected regional event is estimated based on geographical distribution of the key search data related to the regional event.

It should be noted that the key search data may include search location. It is understood that when a user searches using a search engine, the search engine obtains the current geographic location where the user is currently searching, and uses the current geographic location as the search location for the search data. With this feature, in the embodiment of the present disclosure, when it is detected there is the regional event, it is possible to estimate where people are most concerned about the event based on the geographical distribution of the key search data within a short period of time of the occurrence of the regional event, thereby obtaining the area where the regional event has a large impact, realizing the location estimation of the detected regional event, which is conducive to the release of regional event information.

With the method for detecting the regional event based on the search engine, the key search data related to the regional event is obtained based on the search data of the search engine, the regional event detection is performed based on the key search data related to the regional event, and when the regional event is detected, the location of the detected regional event is estimated based on geographical distribution of the key search data related to the regional event. In other words, the regional event detection is achieved based on the search data in the search engine. The regional event detection using real-time search data from the search engine can reflect people's feelings about the regional event and achieve the location estimate for the possible regional event, which can be used in places where there is no physical regional event detection device (such as a physical seismic network). As long as there is a network and users perform searching by the search engine, the regional event monitoring can be achieved. This detection method is not subject to influences of factors such as construction conditions of physical monitoring device, construction area and funds required for construction. Compared with conventional methods using physical monitoring devices to detect the regional event, this detection method expands the monitoring scope.

Figure 4:
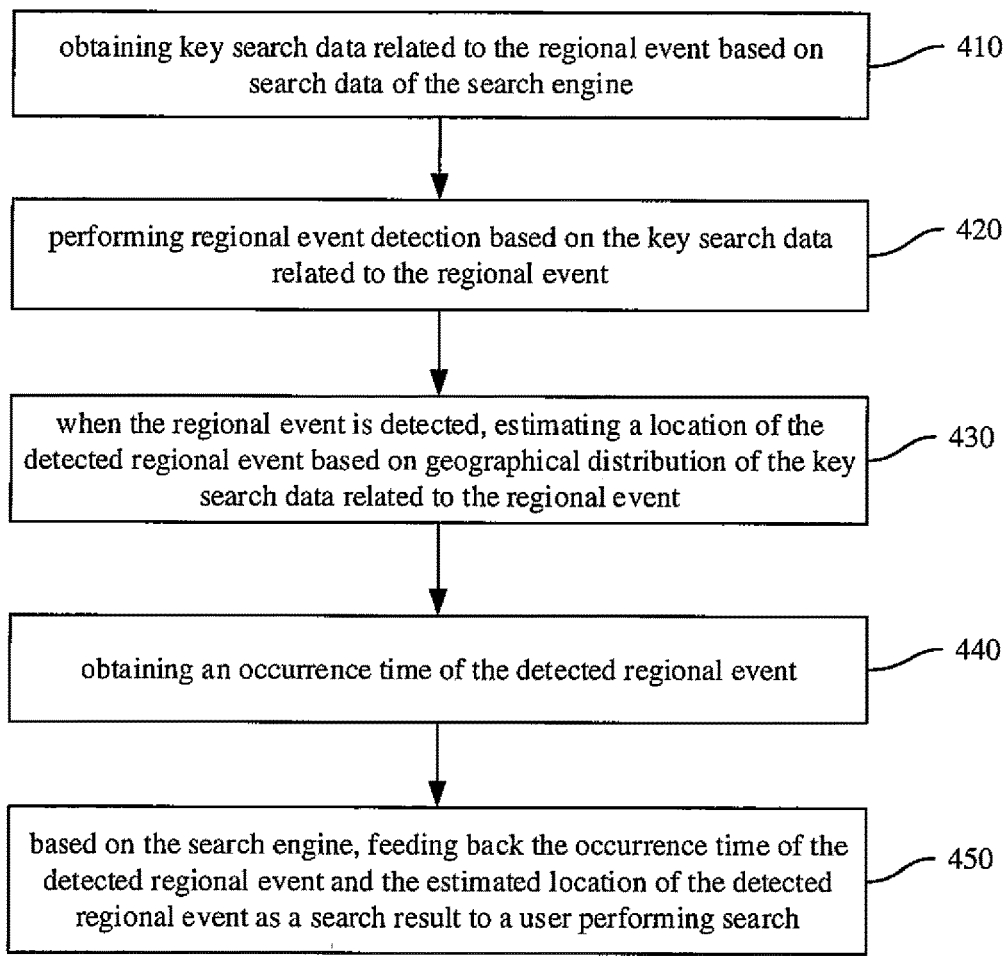
FIG. 4 is a flowchart of a method for detecting a regional event based on a search engine according to an embodiment of the present disclosure.

FIG. 4 is a flowchart of a method for detecting a regional event based on a search engine according to an embodiment of the present disclosure. In order to meet the user's information requirements in a timely manner, when the occurrence of the regional event is detected, the regional event occurrence information can be quickly played. In detail, as illustrated in FIG. 4, the method for detecting the regional event based on the search engine may include the following actions.

At block 410, key search data related to the regional event is obtained based on search data of the search engine.

At block 420, regional event detection is performed based on the key search data related to the regional event.

At block 430, when the regional event is detected, a location of the detected regional event is estimated based on geographical distribution of the key search data related to the regional event.

It should be noted that, in the embodiments of the present disclosure, the specific implementation process of block 410 to block 430 may refer to the description of the specific implementation process of block 110 to block 130, which is not repeated herein.

At block 440, an occurrence time of the detected regional event is obtained.

For example, the occurrence time of the regional event may be determined according to the detection time point at which an occurrence of the event is detected and a plurality of differential time intervals selected. For example, the maximum differential time interval may be selected from the plurality of differential time intervals, and the detection time point is used to subtract the maximum differential time interval to obtain the occurrence time of the regional event.

At block 450, based on the search engine, the occurrence time of the detected regional event and the estimated location of the detected regional event are fed back as a search result to a user performing search.

For example, under a case that a user feels that a regional event has occurred, such as feeling a shock, when a search is performed on the search engine for the regional event, for example, if the user enters search content that contains keywords related to the regional event in the search engine, at this time, if many other users in the same area as the user are also searching for the regional event, the detection method according to the embodiments of the present disclosure can detect that the regional event may have occurred, and this can be directly included in the search results and feedback to users to meet users' information requirements in a timely manner.

In order to further improve the user experience, regional event information can be released in a targeted manner, and security information can also be released in time to avoid rumors based on the comparison with the information released by the regional event supervision center server. As an example, regional event rapid report information issued by a regional event supervision center server is obtained, it is determined whether the regional event really occurs according to the regional event rapid report information, the occurrence time of the detected regional event and the estimated location of the detected regional event; if yes, based on the search engine, the occurrence time of the detected regional event and the estimated location of the detected regional event are fed back as the search result to the user performing the search; and if not, based on the search engine, security information is generated and the security information is fed back as the search result to the user performing search.

That is, when it is detected that the regional event occurs based on the search data of the search engine, the occurrence time and estimated location of the detected regional event can be compared with the regional event rapid report information issued by the regional event supervision center server to determine whether the regional event has actually occurred. If the regional event has actually occurred, based on the search engine, the occurrence time and estimated location of the detected regional event are fed back as the search result to the user performing the search; and if no regional event occurs, the security information is generated, and based on the search engine, the security information is fed back as the search result to the user performing the search, to calm the public and there are no destructive regional event that happened, thus regional event information can be released in a targeted, timely, and accurate manner, and the user's information requirements can be met as quickly as possible.

With the method for detecting the regional event based on the search engine according to the embodiment of the present disclosure, when it is detected that the regional event occurs based on the search data in the search engine, the search engine may use the occurrence time and estimated location of the detected regional event as the search results and feedback to the users who are searching, which can rapidly report regional event information according to people's requirements for regional event information, meet the user's information requirements in a timely manner, and improve the user experience.

It should be noted that, in the embodiments of the present disclosure, the regional event may include natural disasters, social events, and the like. As an example, the method for detecting the regional event based on the search engine according to the embodiment of the present disclosure can be applied for detection of various natural disaster events, such as earthquake event detection, tsunami event detection, typhoon event detection, volcanic eruption event detection, and the like. The following describes the method for detecting the regional event based on the search engine according to the embodiment of the present disclosure as an example for the earthquake event detection scenario.

It is understood that the analysis of the search data by the inventors found that after the earthquake, the search related to the keyword "earthquake" quickly erupt in a short period of time, which means that when people feel the earthquake, they quickly seek the latest earthquake news on the Internet, and at this time the traditional rapid reporting news information has not yet been released. This search for information not only reflects the people's requirements to quickly obtain earthquake-related information, but also uses the search data for earthquake detection.

Figure 5:
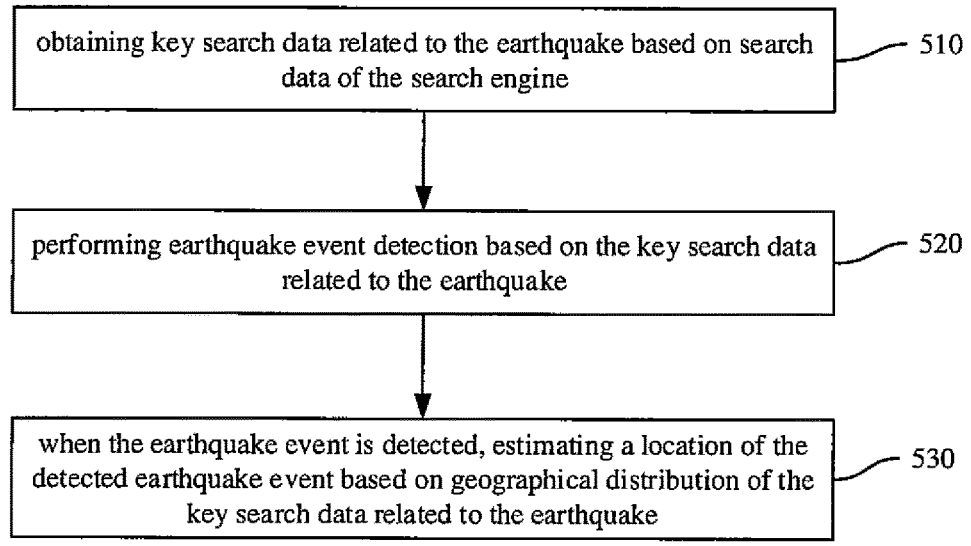
FIG. 5 is a flowchart of a method for detecting a regional event based on a search engine according to an embodiment of the present disclosure.

The difference between the method for detecting the regional event based on the search engine according to the embodiment of the present disclosure and the traditional earthquake detection method based on seismic wave signals is that the present disclosure uses real-time search data of the search engine of the Internet for real-time earthquake detection, and also designs an earthquake event detection algorithm specifically suitable for the search data. The search engine is also used for timely feedback and release of information during the rapid earthquake report. FIG. 5 is a flowchart of a method for detecting a regional event based on a search engine according to an embodiment of the present disclosure. It should be noted that, in the embodiment of the present disclosure, description is made by taking a regional event as an earthquake event as an example. As illustrated in FIG. 5, the method for detecting the regional event based on the search engine may include the following actions.

At block 510, key search data related to the earthquake is obtained based on search data of the search engine.

In an embodiment of the present disclosure, the search data may include information such as search content, search time, and search location.

It is understood that, the stored search data includes a large number of searches that are not related to the earthquake, and the searches that are most closely related to the earthquake need to be filtered out to obtain the key search data related to the earthquake. For example, based on the search content in the search data, target search data containing preset keywords may be selected from the search data of the search engine, and according to search content and search time in the target search data, the number of each search within a first preset time period before and after the earthquake occurs is counted to obtain an average search frequency of each search before the earthquake occurs and an average search frequency of each search after the earthquake occurs. According to the average search frequency of each search before the earthquake occurs and the average search frequency of each search after the earthquake occurs, the correlation degree between each search and the sudden occurrence of the earthquake event is calculated, and then the key search data related to the earthquake is selected from the target search data according to the correlation degree between each search and the sudden occurrence of the earthquake event.

At block 520, earthquake event detection is performed based on the key search data related to the earthquake.

Figure 6:
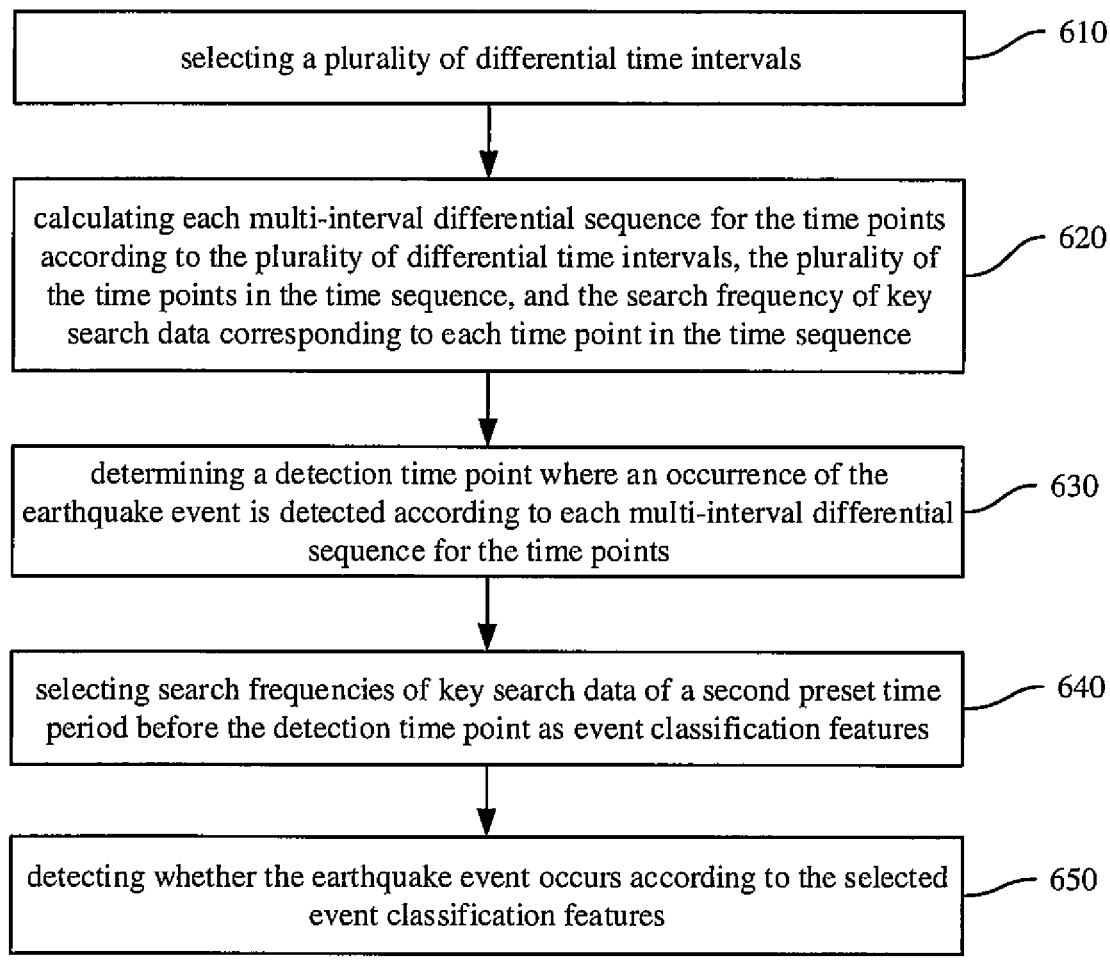
FIG. 6 is a flowchart of a method for detecting a regional event based on a search engine according to an embodiment of the present disclosure.

Alternatively, according to the search content and search time in the target search data, the key search data is converted into a time sequence, in which the time sequence is used to indicate changes of the search frequency of the key search data over time, and the time sequence includes a plurality of time points and a search frequency of key search data corresponding to each time point. It is detected whether the earthquake event occurs according to the plurality of time points and the search frequency of key search data corresponding to each time point in the time sequence. As an example, the search data may include search content and search time as an example. As illustrated in FIG. 6, the process of detecting whether the earthquake event occurs according to the plurality of time points and the search frequency of key search data corresponding to each time point in the time sequence may include the followings.

At block 610, a plurality of differential time intervals are selected.

At block 620, each multi-interval differential sequence for the time points is calculated according to the plurality of differential time intervals, the plurality of the time points in the time sequence, and the search frequency of key search data corresponding to each time point in the time sequence.

At block 630, a detection time point where an occurrence of the earthquake event is detected, is determined according to each multi-interval differential sequence for the time points.

As an example, for each time point, a short-term average value and a long-term average value of each interval may be calculated according to each multi-interval differential sequence for the time points. According to the short-term average value and the long-term average value, the ratio of the short-term average value to the long-term average value of each interval is calculated; when it is determined that the ratio of each interval is greater than a preset threshold value of each interval in a maximum differential time interval before a time point, it is detected that the earthquake event occurs, and the one time point is determined as the detection time point where the occurrence of the earthquake event is detected.

At block 640, search frequencies of key search data of a second preset time period before the detection time point are selected as event classification features.

At block 650, it is detected whether the earthquake event occurs according to the selected event classification features.

Therefore, through the above blocks 610 to 650, it is possible to detect whether the earthquake event occurs based on the characteristics of the changes of the search frequency of the key search data over time.

At block 530, when the earthquake event is detected, a location of the detected earthquake event is estimated based on geographical distribution of the key search data related to the earthquake.

In order to meet the user's information requirements in a timely manner, alternatively, in an embodiment of the present disclosure, the occurrence time of the detected earthquake event may also be obtained, and based on the search engine, the occurrence time and the location estimated of the detected earthquake event is fed back as the search result to a user who performs the search.

As an example, the earthquake rapid report information released by the server of the earthquake event supervision center is obtained, and it is determined whether the earthquake has really occurred according to the earthquake rapid report information, the occurrence time and the location estimated of the detected earthquake event. If yes, based on the search engine, the occurrence time and the location estimated of the detected earthquake event are fed back as the search result to the user performing the search; and if not, security information is generated and, based on the search engine, the security information is fed back as the search result to the user performing the search, to calm the public and there are no destructive regional event that happened, thus earthquake event information can be released in a targeted, timely, and accurate manner, and the user's information requirements can be met as quickly as possible.

With the method for detecting the earthquake event based on the search engine, the key search data related to the earthquake is obtained based on the search data of the search engine, the earthquake event detection is performed based on the key search data related to the earthquake, and when the earthquake event are detected, the location of the detected earthquake event is estimated based on geographical distribution of the key search data related to the earthquake. In other words, the earthquake event detection is achieved based on the search data in the search engine. The earthquake event detection using real-time search data from the search engine can reflect people's feelings about the earthquake event and achieve the location estimate for the possible earthquake event, which can be used in places where there is no physical earthquake event detection device (such as a physical seismic network). As long as there is a network and users perform searching by the search engine, the earthquake event monitoring can be achieved. This detection method is not subject to influences of factors such as construction conditions of physical monitoring device, construction area and funds required for construction. Compared with conventional methods using physical monitoring devices to detect the earthquake event, this detection method expands the monitoring scope.

Figure 7:
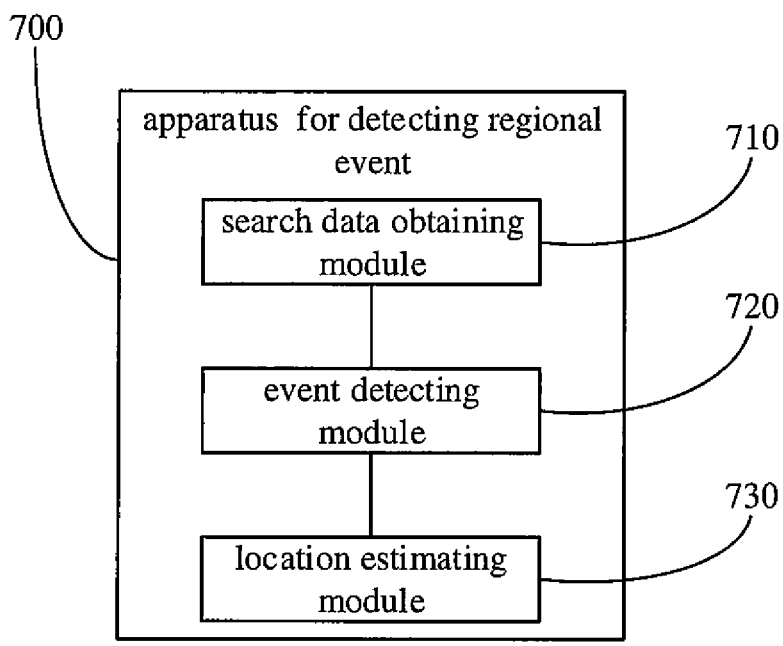
FIG. 7 is a schematic diagram of an apparatus for detecting a regional event based on a search engine according to an embodiment of the present disclosure.

Corresponding to the method for detecting the regional event based on the search engine according to the foregoing embodiments, an embodiment of the present disclosure further provides an apparatus for detecting a regional event based on a search engine. Since the apparatus for detecting the regional event based on the search engine corresponds to the method for detecting the regional event based on the search engine, the foregoing implementation of the method for detecting the regional event based on the search engine is also applicable for the apparatus for detecting the regional event based on the search engine, which is not described in detail in this embodiment. FIG. 7 is a schematic diagram of an apparatus for detecting a regional event based on a search engine according to an embodiment of the present disclosure. As illustrated in FIG. 7, an apparatus 700 for detecting the regional event based on the search engine may include a search data obtaining module 710, an event detecting module 720, and a location estimating module 730.

The search data obtaining module 710 is configured to obtain key search data related to the regional event based on search data of the search engine. In the embodiment of this disclosure, the search data includes search content and search time. For example, the search data obtaining module 710 is configured to: select target search data containing preset keywords from the search data of the search engine based on the search content in the search data; according to search content and search time in the target search data, count a number of each search within a first preset time period before and after the regional event occurs to calculate an association degree between each search and a sudden occurrence of the regional event; and select the key search data related to the regional event from the target search data according to the association degree between each search and the sudden occurrence of the regional event.

In the embodiments of the present disclosure, the search data obtaining module 710 is configured to: according to the search content and the search time in the target search data, count the number of each search within the first preset time period before and after the regional event occurs to obtain an average search frequency of each search before the regional event occurs and an average search frequency of each search after the regional event occurs; and calculate the association degree between each search and the sudden occurrence of the regional event based on the average search frequency of each search before the regional event occurs and the average search frequency of each search after the regional event occurs.

Figure 8:
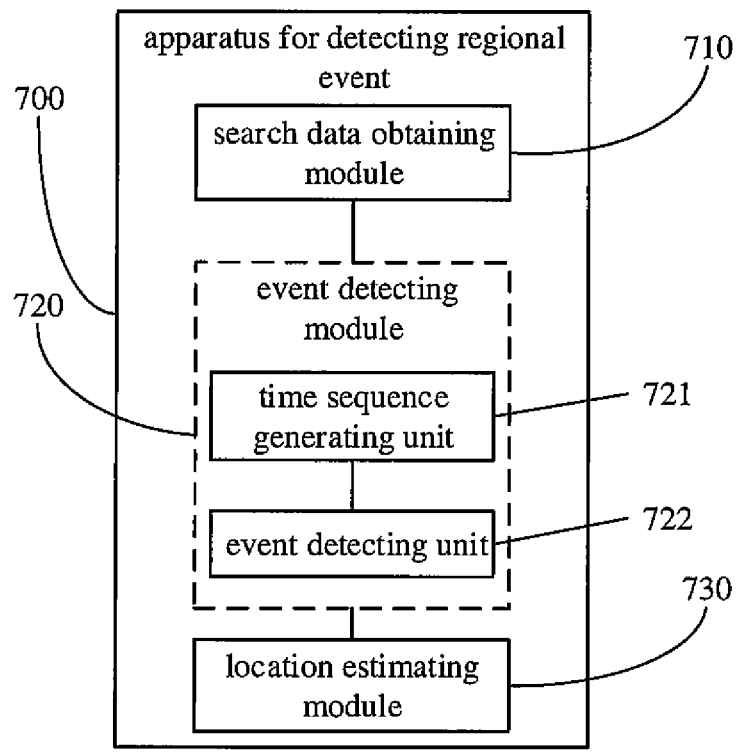
FIG. 8 is a schematic diagram of an apparatus for detecting a regional event based on a search engine according to an embodiment of the present disclosure.

The event detecting module 720 is configured to perform regional event detection based on the key search data related to the regional event. For example, as illustrated in FIG. 8, the event detecting module 720 includes a time sequence generating unit 721 and an event detecting unit 722. The time sequence generating unit 721 is configured to convert the key search data into a time sequence according to search content and search time in the key search data, wherein the time sequence comprises a plurality of time points and a search frequency of key search data corresponding to each time point. The event detecting unit 722 is configured to detect whether the regional event occurs according to the plurality of time points and the search frequency of key search data corresponding to each time point in the time sequence.

In the embodiments of the present disclosure, the event detecting unit 722 is configured to: select a plurality of differential time intervals; calculate each multi-interval differential sequence for the time points according to the plurality of differential time intervals, the plurality of the time points in the time sequence, and the search frequency of key search data corresponding to each time point in the time sequence; determine a detection time point where an occurrence of the regional event is detected according to each multi-interval differential sequence for the time points; select search frequencies of key search data of a second preset time period before the detection time point as event classification features; and detect whether the regional event occurs according to the selected event classification features.

In the embodiments of the present disclosure, the event detecting unit 722 is configured to: for each time point, calculate a short-term average value and a long-term average value of each interval according to each multi-interval differential sequence for the time points; calculate a ratio of the short-term average value to the long-term average value of each interval according to the short-term average value and long-term average value of each interval; and when it is determined that the ratio of each interval is greater than a preset threshold value of each interval in a maximum differential time interval before a time point, detect that the regional event occurs, and determine the one time point as the detection time point where the occurrence of the regional event is detected.

The location estimating module 730 is configured to estimate a location of the detected regional event based on geographical distribution of the key search data related to the regional event, when the regional event is detected.

Figure 9:
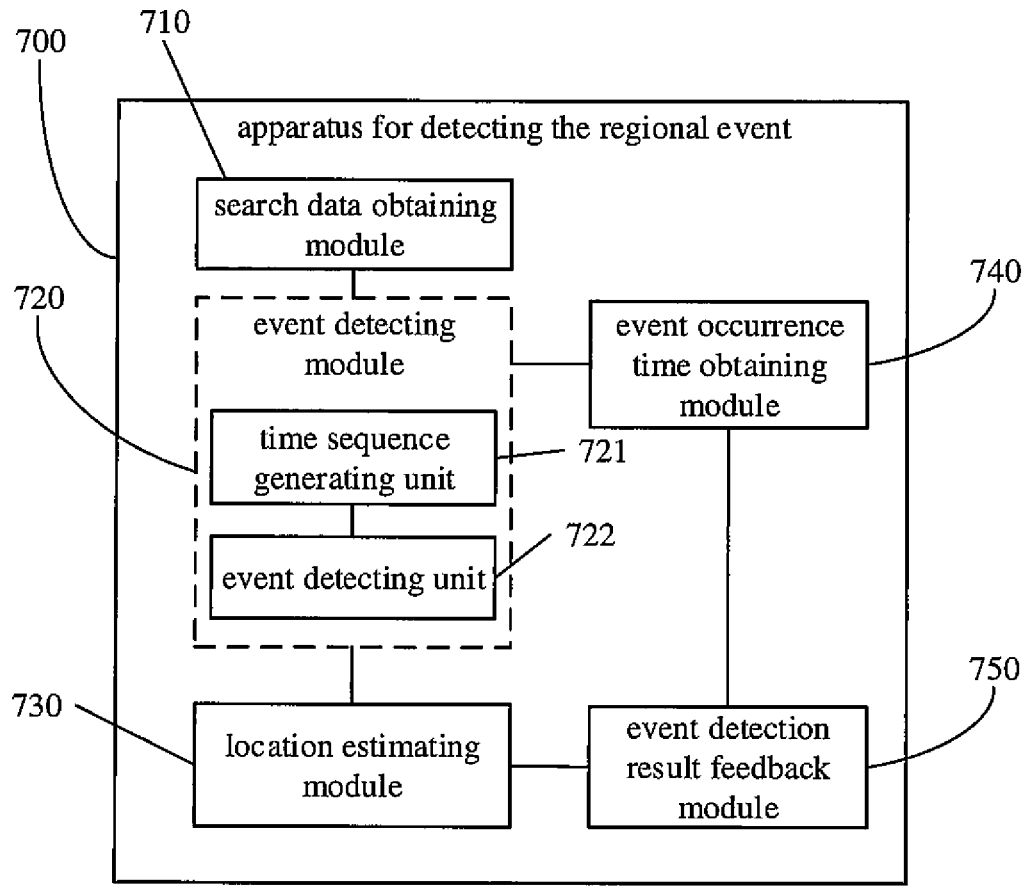
FIG. 9 is a schematic diagram of an apparatus for detecting a regional event based on a search engine according to an embodiment of the present disclosure.

In order to meet the user's information requirements in a timely manner, alternatively, in an embodiment of the present disclosure, as illustrated in FIG. 9, the apparatus 700 for detecting the regional event based on the search engine may further include: an event occurrence time obtaining module 740 and an event detection result feedback module 750. The event occurrence time obtaining module 740 is configured to obtain an occurrence time of the detected regional event. The event detection result feedback module 750 is configured to, based on the search engine, feed back the occurrence time of the detected regional event and the estimated location of the detected regional event as a search result to a user performing search.

For example, the event detection result feedback module 750 is configured to: obtain regional event rapid report information issued by a regional event supervision center server; determine whether the regional event really occurs according to the regional event rapid report information, the occurrence time of the detected regional event and the estimated location of the detected regional event; if yes, based on the search engine, feed back the occurrence time of the detected regional event and the estimated location of the detected regional event as the search result to the user performing search; and if not, based on the search engine, generate security information and feed back the security information as the search result to the user performing search, to calm the public and there are no destructive regional event that happened, thus regional event information can be released in a targeted, timely, and accurate manner, and the user's information requirements can be met as quickly as possible.

With the apparatus for detecting the regional event based on the search engine, the key search data related to the regional event is obtained based on the search data of the search engine, the regional event detection is performed based on the key search data related to the regional event, and when the regional event is detected, the location of the detected regional event is estimated based on geographical distribution of the key search data related to the regional event. In other words, the regional event detection is achieved based on the search data in the search engine. The regional event detection using real-time search data from the search engine can reflect people's feelings about the regional event and achieve the location estimate for the possible regional event, which can be used in places where there is no physical regional event detection device (such as a physical seismic network). As long as there is a network and users perform searching by the search engine, the regional event monitoring can be achieved. This detection method is not subject to influences of factors such as construction conditions of physical monitoring device, construction area and funds required for construction. Compared with conventional methods using physical monitoring devices to detect the regional event, this detection method expands the monitoring scope.

In order to implement the above embodiments, the present disclosure also provides a search engine, and the search engine may include the apparatus for detecting the regional event based on the search engine according to any one of the above embodiments of the present disclosure.

In order to implement the above embodiments, the present disclosure also provides a computer device.

Figure 10:
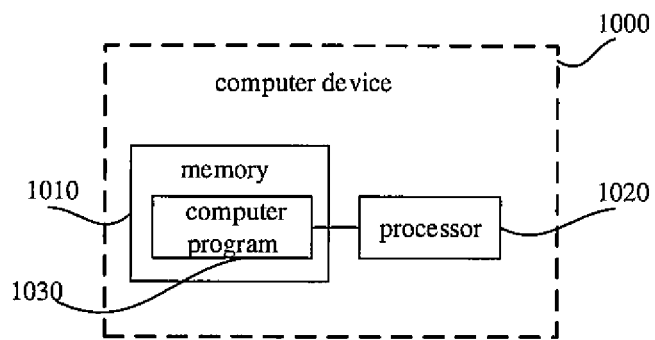
FIG. 10 is a schematic diagram of a computer device according to an embodiment of the present disclosure.

FIG. 10 is a schematic diagram of a computer device according to an embodiment of the present disclosure. As illustrated in FIG. 10, the computer device 1000 may include: a memory 1010, a processor 1020, and a computer program 1030 stored in the memory 1010 and executable on the processor 1020. When the program 1030 is executed by the processor 1020, the foregoing method for detecting the regional event based on the search engine according to any one of the embodiments of the present disclosure is implemented.

In order to implement the above embodiments, the present disclosure also provides a computer-readable storage medium on which a computer program is stored. When the computer program is executed by a processor, the method for detecting the regional event based on the search engine according to any one of the embodiments is implemented.

In addition, terms such as "first" and "second" are used herein for purposes of description and are not intended to indicate or imply relative importance or significance, or implicitly indicate the number of technical features indicated. Thus, the feature defined with "first" and "second" may comprise one or more this feature. In the description of the present disclosure, "a plurality of" means at least two, for example, two or three, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A computer-implemented method for detecting a regional event based on a search engine, comprising:
obtaining key search data related to the regional event based on search data of the search engine;

performing regional event detection based on the key search data related to the regional event; and when the regional event is detected, estimating a location of the detected regional event based on geographical distribution of the key search data related to the regional event, wherein performing the regional event detection based on the key search data related to the regional event, comprises:

converting the key search data into a time sequence according to search content and search time in the key search data, wherein the time sequence comprises a plurality of time points and a search frequency of key search data corresponding to each time point; and detecting whether the regional event occurs according to the plurality of time points and the search frequency of key search data corresponding to each time point in the time sequence, wherein detecting whether the regional event occurs according to the plurality of time points and the search frequency of key search data corresponding to each time point in the time sequence, comprises:

selecting a plurality of differential time intervals;

calculating each multi-interval differential sequence for the time points according to the plurality of differential time intervals, the plurality of the time points in the time sequence, and the search frequency of key search data corresponding to each time point in the time sequence;

determining a detection time point where an occurrence of the regional event is detected according to each multi-interval differential sequence for the time points;

selecting search frequencies of key search data of a second preset time period before the detection time point as event classification features; and detecting whether the regional event occurs according to the selected event classification features, wherein determining the detection time point where the occurrence of the regional event is detected according to each multi-interval differential sequence for the time points, comprises:

for each time point, calculating a short-term average value and a long-term average value of each interval according to each multi-interval differential sequence for the time points;

calculating a ratio of the short-term average value to the long-term average value of each interval according to the short-term average value and long-term average value of each interval; and when it is determined that the ratio of the short-term average value to the long-term average value of each interval is greater than a preset threshold value of each interval in a maximum differential time interval before a time point, determining the time point as the detection time point where the occurrence of the regional event is detected.

2. The method according to claim 1, wherein the search data comprises search content and search time, and obtaining the key search data related to the regional event based on the search data of the search engine comprises:

selecting target search data containing preset keywords from the search data of the search engine based on the search content in the search data;

according to search content and search time in the target search data, counting a number of each search within a first preset time period before and after the regional event occurs to calculate an association degree between each search and a sudden occurrence of the regional event, wherein each search relates to one of the preset keywords; and selecting the key search data related to the regional event from the target search data according to the association degree between each search and the sudden occurrence of the regional event.

3. The method according to claim 2, wherein according to the search content and the search time in the target search data, counting the number of each search within the first preset time period before and after the regional event occurs to calculate the association degree between each search and the sudden occurrence of the regional event, comprises:

according to the search content and the search time in the target search data, counting the number of each search within the first preset time period before and after the regional event occurs to obtain an average search frequency of each search before the regional event occurs and an average search frequency of each search after the regional event occurs; and calculating the association degree between each search and the sudden occurrence of the regional event based on the average search frequency of each search before the regional event occurs and the average search frequency of each search after the regional event occurs.

4. The method according to claim 1, comprising:

obtaining an occurrence time of the detected regional event; and based on the search engine, feeding back the occurrence time of the detected regional event and the estimated location of the detected regional event as a search result to a user performing search.

5. The method according to claim 4, wherein based on the search engine, feeding back the occurrence time of the detected regional event and the estimated location of the detected regional event as a search result to a user performing search, comprises:

obtaining regional event rapid report information issued by a regional event supervision center server;

determining whether the regional event really occurs according to the regional event rapid report information, the occurrence time of the detected regional event and the estimated location of the detected regional event;

if yes, based on the search engine, feeding back the occurrence time of the detected regional event and the estimated location of the detected regional event as the search result to the user performing search; and if not, based on the search engine, generating security information and feeding back the security information as the search result to the user performing search.

6. An apparatus for detecting a regional event based on a search engine, comprising:

a processor; and a non-transitory computer-readable storage medium storing a plurality of computer-executable instruction modules that are executed by the processor, wherein the computer-executable instruction modules comprises:

a search data obtaining module, configured to obtain key search data related to the regional event based on search data of the search engine;

an event detecting module, configured to perform regional event detection based on the key search data related to the regional event; and a location estimating module, configured to estimate a location of the detected regional event based on geographical distribution of the key search data related to the regional event, when the regional event is detected, wherein the event detecting module comprises:

a time sequence generating unit, configured to convert the key search data into a time sequence according to search content and search time in the key search data, wherein the time sequence comprises a plurality of time points and a search frequency of key search data corresponding to each time point; and an event detecting unit, configured to detect whether the regional event occurs according to the plurality of time points and the search frequency of key search data corresponding to each time point in the time sequence, wherein the event detecting unit is configured to:

select a plurality of differential time intervals;

calculate each multi-interval differential sequence for the time points according to the plurality of differential time intervals, the plurality of the time points in the time sequence, and the search frequency of key search data corresponding to each time point in the time sequence;

determine a detection time point where an occurrence of the regional event is detected according to each multi-interval differential sequence for the time points;

select search frequencies of key search data of a second preset time period before the detection time point as event classification features; and detect whether the regional event occurs according to the selected event classification features, wherein the event detecting unit is configured to:

for each time point, calculate a short-term average value and a long-term average value of each interval according to each multi-interval differential sequence for the time points;

calculate a ratio of the short-term average value to the long-term average value of each interval according to the short-term average value and long-term average value of each interval; and when it is determined that the ratio of the short-term average value to the long- term average value of each interval is greater than a preset threshold value of each interval in a maximum differential time interval before a time point, determine the time point as the detection time point where the occurrence of the regional event is detected.

7. The apparatus according to claim 6, wherein the search data comprises search content and search time, and the search data obtaining module is configured to:

select target search data containing preset keywords from the search data of the search engine based on the search content in the search data;

according to search content and search time in the target search data, count a number of each search within a first preset time period before and after the regional event occurs to calculate an association degree between each search and a sudden occurrence of the regional event, wherein each search relates to one of the preset keywords; and select the key search data related to the regional event from the target search data according to the association degree between each search and the sudden occurrence of the regional event.

8. The apparatus according to claim 7, wherein the search data obtaining module is configured to:

according to the search content and the search time in the target search data, count the number of each search within the first preset time period before and after the regional event occurs to obtain an average search frequency of each search before the regional event occurs and an average search frequency of each search after the regional event occurs; and calculate the association degree between each search and the sudden occurrence of the regional event based on the average search frequency of each search before the regional event occurs and the average search frequency of each search after the regional event occurs.

9. The apparatus according to claim 6, wherein the computer-executable instruction modules further comprise:

an event occurrence time obtaining module, configured to obtain an occurrence time of the detected regional event; and an event detection result feedback module, configured to, based on the search engine, feed back the occurrence time of the detected regional event and the estimated location of the detected regional event as a search result to a user performing search.

10. The apparatus according to claim 9, wherein the event detection result feedback module is configured to:

obtain regional event rapid report information issued by a regional event supervision center server;

determine whether the regional event really occurs according to the regional event rapid report information, the occurrence time of the detected regional event and the estimated location of the detected regional event;

if yes, based on the search engine, feed back the occurrence time of the detected regional event and the estimated location of the detected regional event as the search result to the user performing search; and if not, based on the search engine, generate security information and feed back the security information as the search result to the user performing search.

11. A non-transitory computer-readable storage medium having a computer program stored thereon, wherein when the computer program is executed by a processor, a method for detecting a regional event based on a search engine is implemented, the method comprises:

obtaining key search data related to the regional event based on search data of the search engine;

performing regional event detection based on the key search data related to the regional event; and when the regional event is detected, estimating a location of the detected regional event based on geographical distribution of the key search data related to the regional event, wherein performing the regional event detection based on the key search data related to the regional event, comprises:

converting the key search data into a time sequence according to search content and search time in the key search data, wherein the time sequence comprises a plurality of time points and a search frequency of key search data corresponding to each time point; and detecting whether the regional event occurs according to the plurality of time points and the search frequency of key search data corresponding to each time point in the time sequence, wherein detecting whether the regional event occurs according to the plurality of time points and the search frequency of key search data corresponding to each time point in the time sequence, comprises:

selecting a plurality of differential time intervals;

calculating each multi-interval differential sequence for the time points according to the plurality of differential time intervals, the plurality of the time points in the time sequence, and the search frequency of key search data corresponding to each time point in the time sequence;

determining a detection time point where an occurrence of the regional event is detected according to each multi-interval differential sequence for the time points;

selecting search frequencies of key search data of a second preset time period before the detection time point as event classification features; and detecting whether the regional event occurs according to the selected event classification features, wherein determining the detection time point where the occurrence of the regional event is detected according to each multi-interval differential sequence for the time points, comprises:

for each time point, calculating a short-term average value and a long-term average value of each interval according to each multi-interval differential sequence for the time points;

calculating a ratio of the short-term average value to the long-term average value of each interval according to the short-term average value and long-term average value of each interval; and when it is determined that the ratio of the short-term average value to the long-term average value of each interval is greater than a preset threshold value of each interval in a maximum differential time interval before a time point, determining the time point as the detection time point where the occurrence of the regional event is detected.

* * * * *